United States Patent

Anders

[15] 3,639,024

[45] Feb. 1, 1972

[54] LEVELING DEVICE FOR POWER FILE

[72] Inventor: Walter G. Anders, Canton, Ohio

[73] Assignee: Diebold, Incorporated, Canton, Ohio

[22] Filed: Nov. 16, 1970

[21] Appl. No.: 89,833

[52] U.S. Cl. .............................................. 312/268, 312/223
[51] Int. Cl. ....................................................... A47b 49/00
[58] Field of Search .................... 312/268, 91, 223; 198/140, 198/148, 151, 137

[56] References Cited

UNITED STATES PATENTS

| | | | |
|---|---|---|---|
| 3,166,366 | 1/1965 | Krug et al. ............................... | 312/223 |
| 3,224,825 | 12/1965 | Sturgis et al. ........................... | 312/268 |
| 3,297,378 | 1/1967 | Krug et al. ............................... | 312/223 |
| 3,363,958 | 1/1967 | Antram .................................... | 312/268 |
| 3,532,405 | 10/1970 | Anders .................................... | 312/268 |

*Primary Examiner*—James T. McCall
*Attorney*—Frease & Bishop

[57] ABSTRACT

A leveling control mechanism for a power filing appliance wherein a number of pan assemblies travel on an endless conveyor in a continuous path. The leveling control mechanism has adjustable and movable components mounted on the file frame or support and a simple single actuator mounted on each pan for directly controlling the stopped location of such pan. The mechanism stops the conveyor so that any selected pan will have a location within one thirty-second of an inch of a desired location regardless of the direction of movement of the conveyor or of unbalanced loading of the conveyor pans or system.

11 Claims, 13 Drawing Figures

PATENTED FEB 1 1972
3,639,024
SHEET 1 OF 4
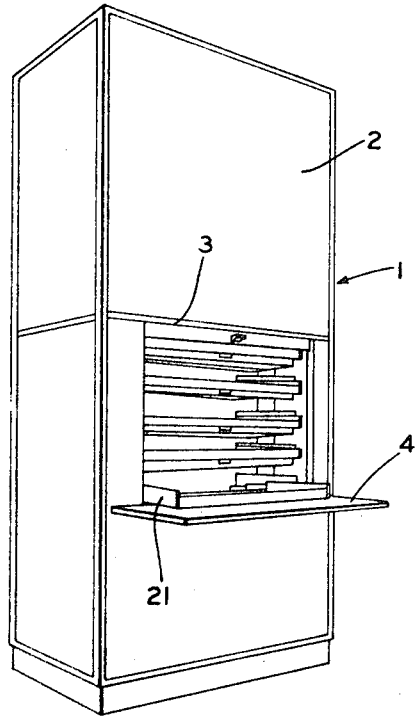
FIG. 1
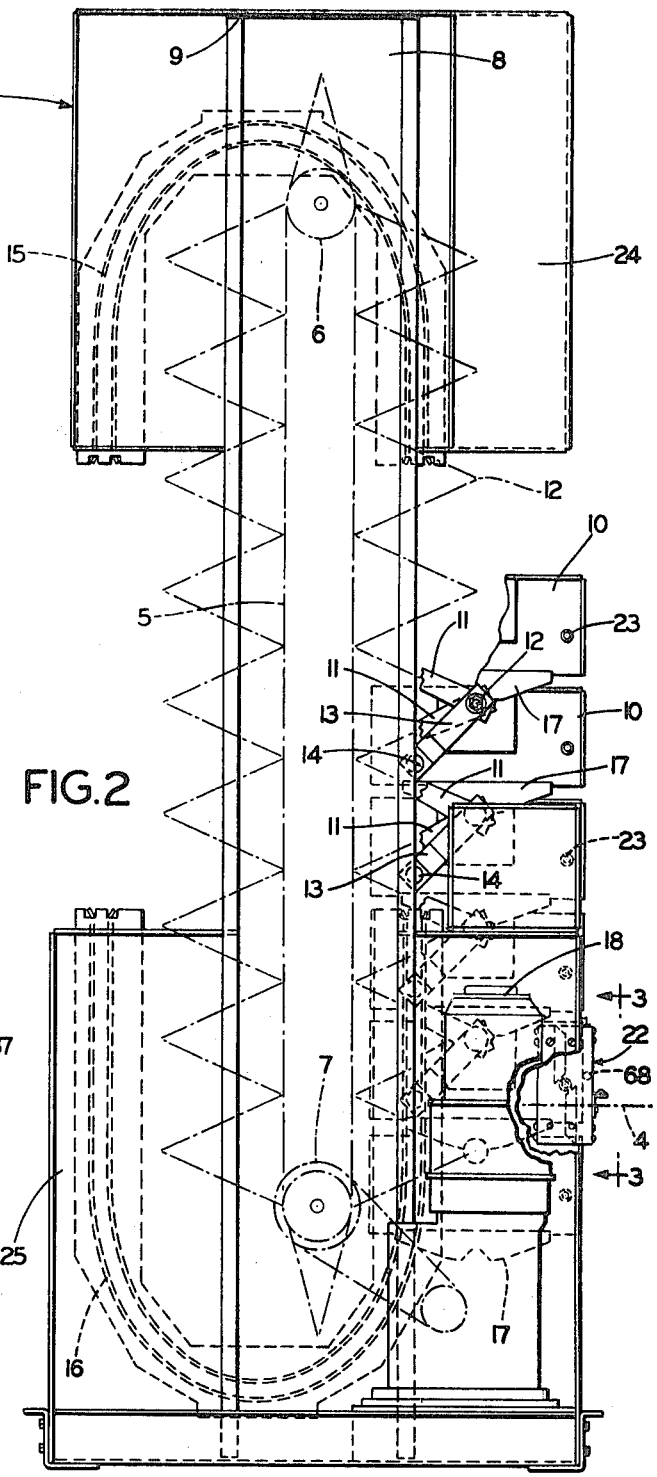
FIG. 2
FIG. 9
INVENTOR.
Walter G. Anders
BY
Frease & Bishop
ATTORNEY INVENTOR.
Walter G. Anders
BY
Frease & Bishop
ATTORNEY

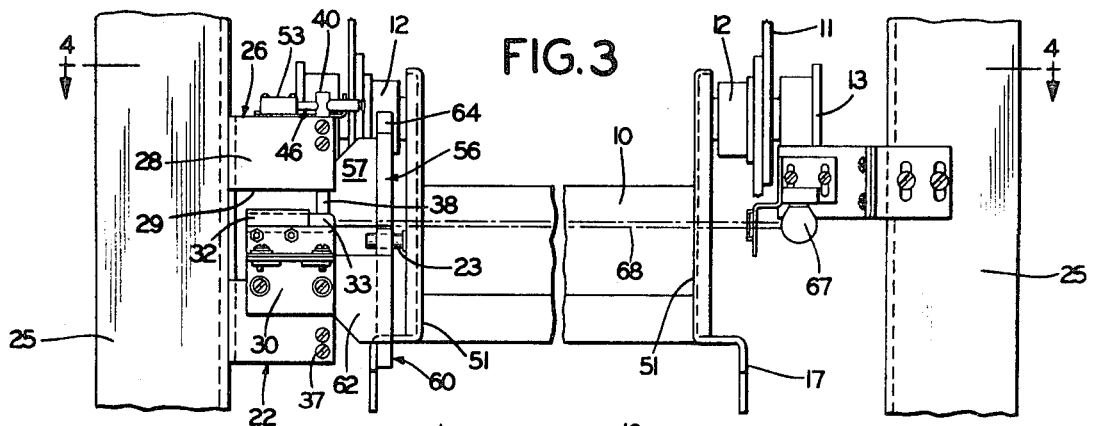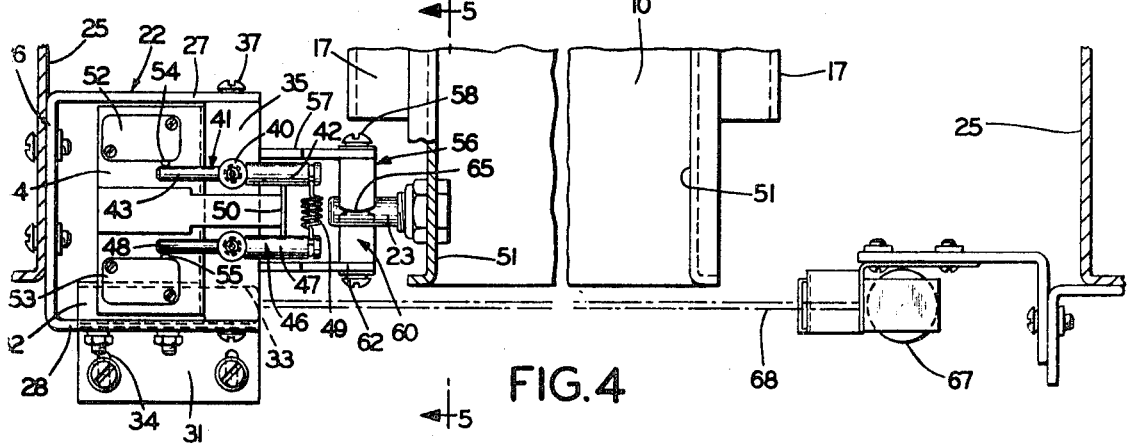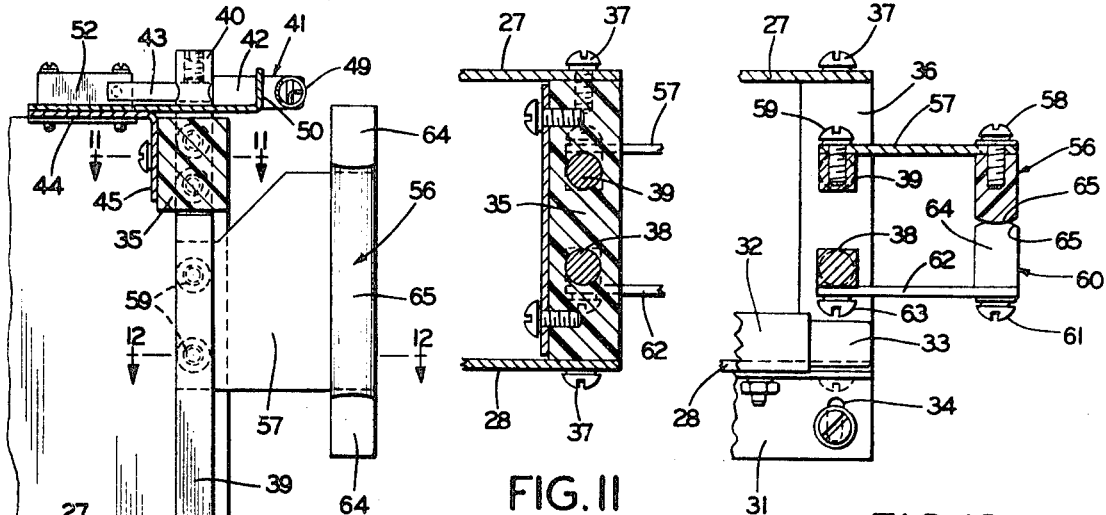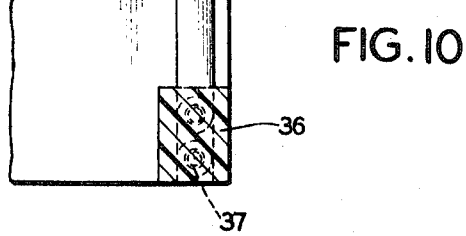

LEVELING DEVICE FOR POWER FILE

CROSS-REFERENCE TO RELATED APPLICATION

The leveling control mechanism is an improvement upon the construction shown, described and claimed in the copending application of Anders and Skolmutch, filed Nov. 5, 1970, Ser. No. 87,228.

BACKGROUND OF THE INVENTION

1. Field of the Invention

The invention relates to a power file of the type of which a plurality of pans are mounted on an endless conveyor for movement in either direction of conveyor travel and any selected pan is delivered by power means to a work station, where a drawer supported on the pan may be moved by power mechanism between retracted and extended positions at the work station, or where a mechanical handling device may be located which manipulates or extracts from the pan some object located at a predetermined position on the pan. Certain types of such power files in use require that any selected pan must be moved to and stopped at a predetermined work station location within at least one thirty-second of an inch of an exact location, so that other equipment the operation of which must be coordinated with conveyor operation may function properly in respect of objects or materials carried by any selected pan.

2. Description of the Prior Art

Power file level control mechanism has been used, such as shown in U.S. Pat. No. 3,363,958, in connection with the delivery of a selected pan to a location adjacent a work station or counter where a tray or drawer on the selected pan may be moved to an "out" or extended position. The endless power file conveyor, powered by a reversing motor whose movement and stopping is controlled by the level control mechanism, has a stabilizing roller associated with each pan. In the prior structure, a stabilizing roller associated with one pan spaced a considerable distance away from a selected pan, is used to actuate switch means to control the stopping of the selected pan at the predetermined location or work station.

Several considerations inherent in the construction and operation of the prior level control mechanism prevent stopping of the selected pan accurately within at least one thirty-second of an inch of an exact location at a work station. First of all, manufacturing tolerances and play between component parts of the conveyor system can make a difference of as much as an eighth of an inch in the distance between a first stabilizing roller and a first pan indexed by the first stabilizing roller, and the distance between a second roller and a second pan indexed by said second stabilizing roller.

Next, the direction of travel of the conveyor, the loading of the conveyor system, and the speed of travel under different loading conditions and direction of travel, can vary the space between such roller-pan indexed relationships.

Next, the length of the "null," which determines the time during which a circuit is broken, in the rotary selector switch controls for a power file, such as in rotary switches of the type shown in U.S. Pat. No. 3,198,894, can prevent the prior level control mechanism from stopping the selected pan within one thirty-second of an inch of an exact location at a work station.

Differences of as much as an eighth of an inch between the location of a selected pan at a work station and a predetermined position at such work station do not interfere with proper operation of a power file where a drawer on the pan is to be ejected from the pan at the work station as in U.S. Pat. Nos. 3,363,958, 3,532,405, and 3,537,768. However, variations in the exact delivered location of a selected power file pan in excess of one thirty-second of an inch cannot be tolerated where the movement or operation of other mechanisms must be coordinated exactly with the selected power file pan delivered at the work station.

These deficiencies in prior power file level control mechanisms have presented problems in a field where power file operation is coordinated with information retrieval devices or devices for photographing or televising objects stored in a power file and which must be extracted for such photographing or televising.

These deficiencies have been corrected by the construction shown in said copending application, Ser. No. 87,228 wherein a pair of ramps or cams that directly control the stopping of a particular selected pan to be stopped, is adjustably mounted on the end of each conveyor pan for actuating the control switch actuating mechanism mounted on the file frame.

This construction involves a number of parts for adjustably mounting the pair of cams on each pan, and involves maintaining a critical adjustment of the cams on each pan. Furthermore, there may be a tendency, because of the engagement and release of the cams on each pan with and from the movable control switch actuating mechanism mounted on the file frame as each pan moves past the control switch actuating mechanism, to loosen the adjusted position of one or the other or both of the cams of the pair mounted on each pan resulting in the need for frequent readjustment.

SUMMARY OF THE INVENTION

Objectives of the invention include providing a power file of the type described with a level control mechanism which will stop a selected file pan within one thirty-second of an inch of a predetermined location at a work station when approaching the predetermined location from either direction of conveyor movement with or without unbalance of the conveyor system; providing a construction in which each pan has a simple actuating member directly mounted in fixed position on the pan and directly engageable with control switch means controlling conveyor movement, so that the location at which any pan is stopped is directly related to the pan itself and is not indirectly determined through remotely located components of the conveyor mechanism or by rotary switch characteristics; providing a construction which is extremely simple in construction, which avoids the requirement of numerous cam parts mounted on each pan, and which eliminates the necessity of frequent adjustment of cams on each pan; and providing a level control mechanism for a power file eliminating difficulties heretofore encountered, achieving the indicated objectives simply, effectively and with precision, and solving problems, and satisfying needs existing in the art.

These objectives and advantages are obtained by the power file leveling mechanism, the general nature of which may be stated as including, in a power file of a type in which a plurality of pans are mounted on endless conveyor mechanism carried by support means for movement in either direction in a continuous path of travel and any selected pan is delivered by conveyor power drive means which may move the conveyor in either direction to a predetermined work station location; leveling control mechanism including first components mounted at a fixed location on a file member adjacent said work station and other components mounted on each pan for cooperative engagement with said first components; said first components including up and down conveyor movement control lever means having levers provided with front and rear ends, the front ends projecting toward and adjacent the path to travel of the pans, said levers being pivotally mounted intermediate their ends and having their rear ends located to engage and actuate up and down conveyor drive control microswitch means; said microswitch means including normally closed microswitches and the rear ends of said levers normally holding the microswitch contacts open; said pan mounted components comprising a simple pin mounted on and projecting from an end of each pan; said control lever means including up and down cam means mounted on fixed position with respect to and movable with said up and down control levers, respectively; said up and down cam means being located respectively adjacent the font ends of the up and down control levers and in path of travel of the pins projecting from the pans for engagement with said pins as the pans pass the control lever means; spring means connected with the front ends of said up and down control levers normally biasing the rear end of the control levers to positions holding the microswitch contacts open; means mounting the control lever means for lateral adjustment with respect to the path of movement of the pins; means mounting the cam means for vertical adjustment with respect to each other and with respect to said levers; and said microswitch means including control circuitry, controlling voltage supplied to said power drive means, connected with said power drive means.

BRIEF DESCRIPTION OF THE DRAWINGS

A preferred embodiment of the invention—illustrative of the best mode in which applicant has contemplated applying the principles—is set forth in the following description and shown in the drawings and is particularly a distinctly pointed out and set forth in the appended claims.

FIG. 1 is a perspective view of a power file equipped with the improved level control mechanism;

FIG. 2 is an enlarged somewhat diagrammatic side elevational with parts broken away and in vertical section at various locations looking toward the left said of FIG. 1, showing the pans in full lines in one sectional portion, and showing a drawer at the work station at an exact location determined by the improved level control mechanism;

FIG. 3 is an enlarged fragmentary front view, with parts broken away, of one of the pans located at the work station looking in the direction of the arrows 3—3, FIG. 2;

FIG. 4 is a further enlarged fragmentary plan sectional view of the parts shown in FIG. 3 looking in the direction of the arrows 4—4, FIG. 3;

FIG. 9 is a view similar to FIGS. 5 and 7 but showing the pin of a pan approaching the work station travelling in a direction opposite to that shown in FIG. 5;

FIG. 10 is a fragmentary sectional view looking in the direction of the arrows 10—10 FIG. 6;

FIG. 11 is a fragmentary sectional view looking in direction of the arrows 11—11, FIG. 10;

FIG. 12 is a fragmentary sectional view looking in the direction of the arrows 12—12, FIG. 10.

Similar numerals refer to similar parts throughout the drawings.

DESCRIPTION OF THE PREFERRED EMBODIMENT

Figure 7:
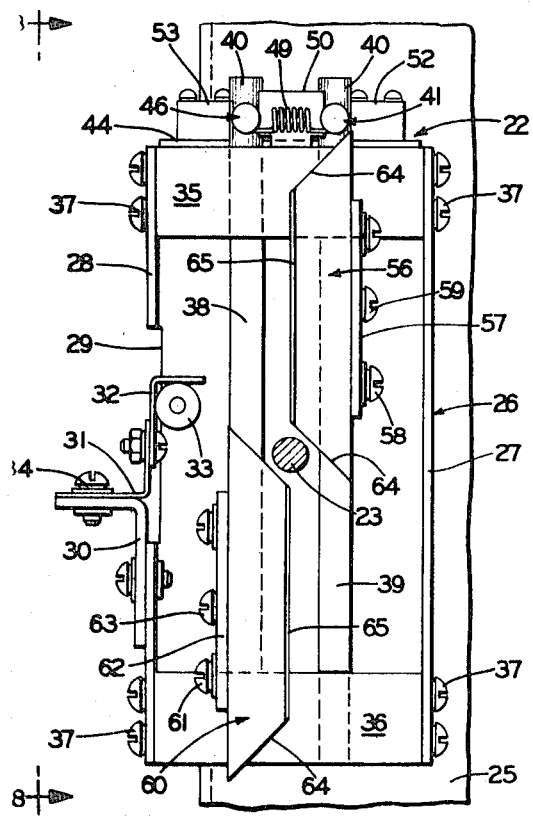
FIG. 7 is a view similar to FIG. 5 but showing only the control pin of the pan of FIG. 5 stopped at the exact predetermined location at the work station.

The improved power file leveling mechanism is illustrated and described in the drawings in connection with power files of the types shown in U.S. Pat. Nos. 3,363,958, 3,532,405, and 3,537,768.

A power file is indicated generally at 1 and may include a housing or cabinet 2, the front wall of which may be provided with an opening 3 above a counter or a work station 4. A pair of conveyor chains 5 trained over sprockets 6 and 7 mounted on upright support members 8 carried at 9 within housing 2 mount a series of pans 10 for movement in either direction in a continuous path of travel.

Each pan 10 is supported or mounted at each end on a pair of arms 11 fixed to a chain 5, and the arms 11 pivotally support an end of pan 10 on pivot stub shafts 12. A stabilizing arm 13 is fixed to each end of each pan 10 having a roller 14 at its other end. Rollers 14 engage and are guided in movement around the upper and lower ends of the path or conveyor travel by semicircular guide channels 15 and 16 to maintain pans 10 in a horizontal position throughout the upper and lower ends of their path of travel on conveyor 5 when traveling around sprockets 6 and 7. Horizontal positioning of pans 10 is maintained during travel in the vertical flights between sprockets 6 and 7 by engagement of V-ears 17 at each end of one pan 10 with the pivot stub shafts 12 of the pan 10 next below.

Figure 13:
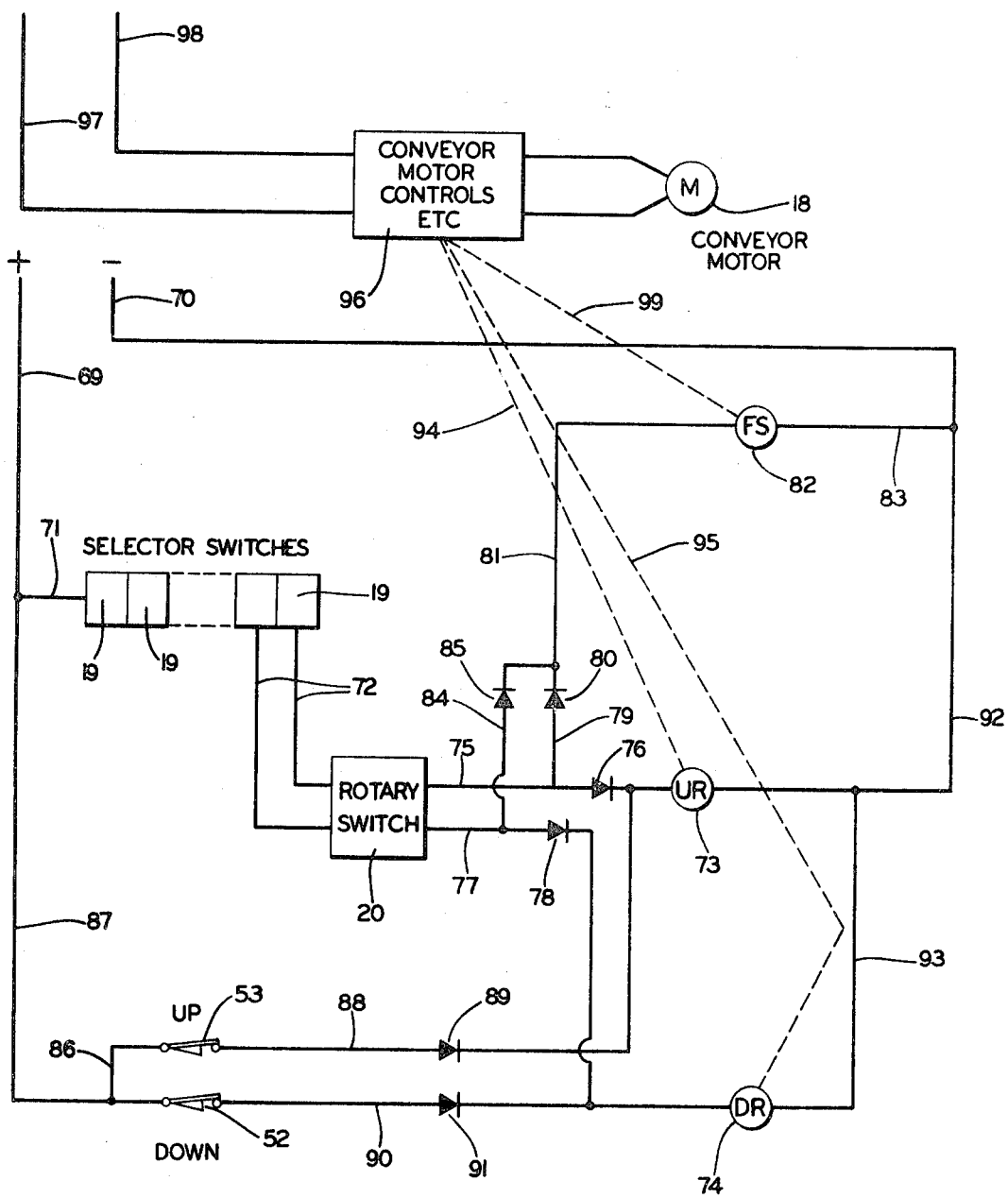
FIG. 13 is a wiring diagram for the construction.

Conveyor 5 is driven in a suitable manner from a drive motor 18 (FIG. 13) which may be a reversing motor, operated preferably by pan selector switches 19 and a rotary selector control switch 20 of a type such as described in U.S. Pat. No. 3,198,894, through up and down holding control and motor drive circuits, relays, etc., such as shown and described in U.S. Pat. No. 3,363,958. The detailed construction and operation of the conveyor, housing, etc., thus briefly described herein may be of the type shown in U.S. Pat. No. 3,199,658.

Power files shown in the identified patents comprise a plurality of pans mounted on an endless conveyor for movement in either direction in a continuous path of travel. Any selected pan is delivered through actuation of a selector switch for a particular pan by power operation of the conveyor to a location opposite the work station 4. When delivered opposite such work station a drawer or tray, such as shown at 21 in FIG. 1 on suspension mechanism on its pan may be moved between retracted and extended positions, either manually or automatically by a power-driven ejector mechanism such as shown in said U.S. Pat. Nos. 3,363,958, 3,532,405, and 3,537,768.

The conveyor 5 moved by a drive motor 18 in accordance with selector switch operation, and selector, holding and drive circuits and relays, as described, also may be accomplished manually by operation of manual "up" and "down" buttons, as indicated in U.S. Pat. No. 3,363,958.

The leveling mechanism, in accordance with the invention, includes elements or components mounted at a fixed location adjacent the work station 4, and elements or components mounted on each pan 10. The components mounted at a fixed location on the file support 8 are generally indicated at 22 (FIG. 4), and the components mounted on each pan comprise control pins 23.

The upper and lower guide channels or tracks 15 and 16 are mounted respectively on upper and lower track frames 24 and 25 mounted within cabinet 2 beyond the ends of the pans 10 as shown in FIGS. 3 and 4. The fixed location components 22 include a U-shaped bracket 26 having side flanges 27 and 28, and side flanges 28 has a side cutout 29 adjacent which an L-shaped bracket 30 is mounted supporting adjustable mounting clips 31 and 32 for an electric eye probe 33. Clip 31 may be adjustably mounted on bracket 30 by slotted-bolt connections 34 (FIG. 6) to permit adjustment of the location of the probe 33.

Figure 5:
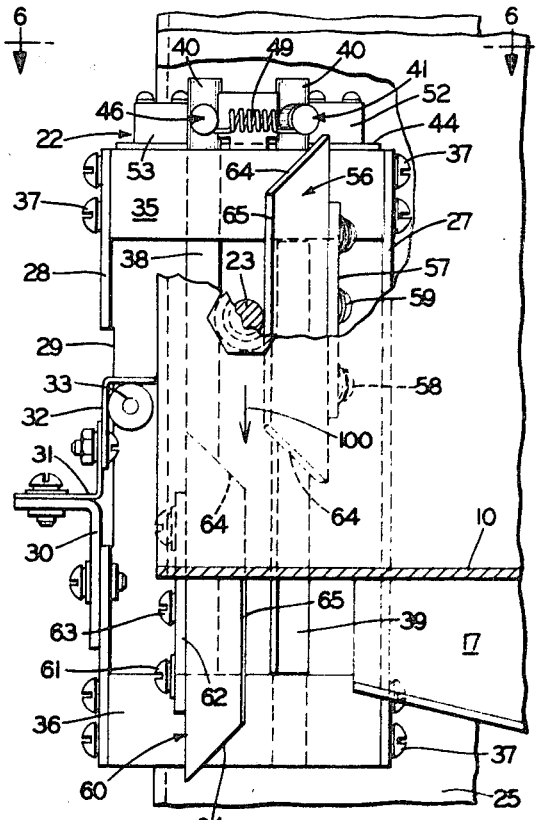
FIG. 5 is an enlarged fragmentary view, with parts in section and broken away, looking in the direction of the arrows 5—5, FIG 4, and showing a pan moving downward toward and approaching the predetermined location where it is to stop at the work station.

Blocks 35 and 36 preferably formed of Nylon are connected by screws 37 to the side flanges 27 and 28 of bracket 26 at the upper and lower corners of said flanges. A pair of vertically extending pivot shafts or bars 38 and 39 are journaled in spaced relation in blocks 35 and 36. Portions of the shafts 38 and 39 located between blocks 35 and 36 are preferably noncircular in cross section, as shown, while the end portions thereof are circular in cross section and the upper ends 40 of shafts 38 and 39 project above upper block 35 (FIGS. 5, 7, and 10).

A "down" control lever 41 is mounted on, and extends through, the upper end 40 of pivot shaft 39 perpendicular to the axis of the shaft with its outer end 42 projecting generally toward the pans 10 and its rear end 43 extending above the horizontal flange 44 of a bracket 45 mounted on upper block 35 (FIG. 10). Similarly, an "up" control lever 46 is mounted on the upper end 40 of pivot shaft 38 perpendicular to the axis of the shaft with its outer end 47 projecting toward pans 10 and its rear end 48 located above bracket flange 44.

A spring 49 is connected with the outer ends 42 and 47 of levers 41 and 46 normally biasing the outer ends of the levers toward each other in the normal position shown in FIG. 4. An upstanding flange 50 mounted on bracket 45 (FIGS. 4, 6, and 10) forms a stop limiting the movement of lever ends 42 and 47 toward each other, and preferably maintains their axes parallel when the levers 41 and 46 are in normal position shown in FIG. 4, and perpendicular to the ends 51 of pans 10.

A "down" control microswitch 52 and an "up" control microswitch 53 are mounted in spaced relation on the horizontal bracket flange 44 at locations so that the rear end 43 of lever 41 can engage the actuating button 54 of switch 52 and so that the rear end 48 of lever 46 can engage the actuating button 55 of switch 53. As stated, the normal position of levers 41 and 46 (FIG. 4) is one in which the switch buttons 54 and 55 are engaged by the rear ends 43 and 48 of levers 41 and 46 holding the normally closed switches 52 and 53 open.

A "down" cam 56 is mounted on a plate 57 by screws 58 and plate 57 in turn is fixed by screws 59 on a squared portion of down pivot shaft 39 (FIGS. 10 and 12) so that down cam 56 and down control lever 41 move together as a unit.

Similarly, an "up " cam 60 is mounted by screws 61 on plate 62 which in turn is mounted by screws 63 on a squared portion of pivot shaft 38 (FIG. 12). The upper and lower ends of cams 56 and 60 preferably are diagonally cut off as indicated at 64, and the vertical cam edges which face in directions toward each other are rounded in cross section as indicated at 65.

Figure 8:
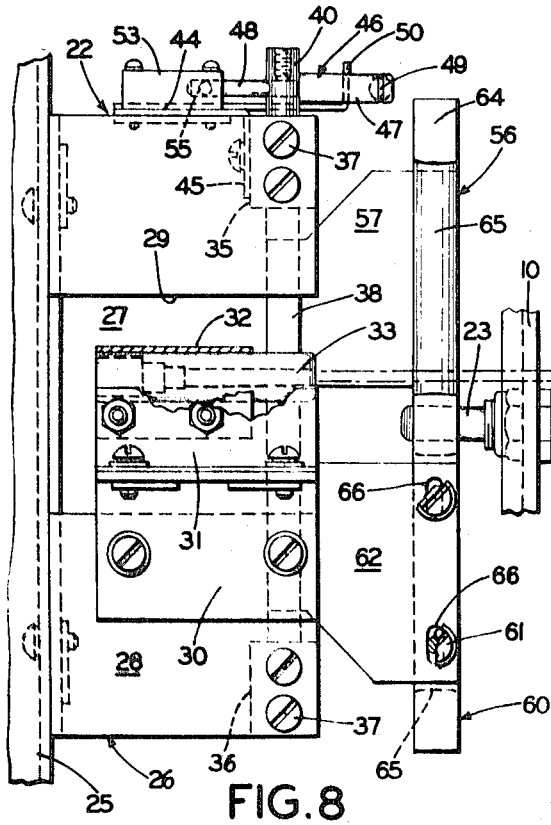
FIG. 8 is a fragmentary front elevation, looking in the direction of the arrows 8—8, FIG. 7, of the parts illustrated in FIG. 7 with certain parts broken away and in section.

Each cam 56 and 60 is vertically adjustable with respect to the pivot shaft on which it is mounted and with respect to the other cam by providing slotted connections 66 between the cams and their mounting plates 57 and 62 (FIG. 8).

As shown in FIGS. 3 through 8, as any pan 10 moves past the file mounted components 22 of the control mechanism, the control pin 23 on each pan end 51 engages first one and then the other cam 56 or 60 depending upon the direction of travel of the pan on the conveyor.

Whenever a pin 23 on any pan end engages one of the cams 56 or 60, the respective cam pivot shaft 39 or 38 is moved so that the control lever projecting from the upper end 40 of the pivot shaft moved, disengages control button 54 or 55 of the microswitch 52 or 53 associated with the pivot shaft moved, by engagement of one of the cams by a cam pin 23.

As best shown in FIGS. 3 and 4, an electric eye 67 may be mounted on the right-hand lower track frame 25 projecting a beam 68 across the front of the path of travel of the conveyors at the cabinet opening 3 adjacent the work station 4. The beam 68 is seen by the probe 33 so that if the beam 68 is interrupted, as by material projecting improperly from any conveyor pan 10, the conveyor drive will be stopped by interconnections between the electric eye control 33–67–68, and the motor drive. The contacts of microswitches 52 and 53 are in circuits which control energizing reduced voltage motor drive circuits for driving the conveyor motor in either direction. These circuits are illustrated diagrammatically in FIG. 13.

Direct current power supply lines 69 and 70 supply power for the control circuitry. Line 71 is connected to pan selector switches 19, which in turn are electrically connected by lines such as 72 with rotary selector control switch 20 which controls "up" and "down" movement of the conveyor through up-relay 73 and down-relay 74. Rotary switch 20 is connected by wire 75 through diode 76 to up-relay 73, and by wire 77 through diode 78 to down-relay 74. Wire 79, diode 80 and line 81 connect wire 75 with fast speed relay 82, which is connected by wire 83 with negative powerline wire 70. Wire 84, diode 85 and line 81 connect wire 77 with relay 82.

The normally closed up and down control microswitches 53 and 52 are connected by lines 86 and 87 with the positive power supply line wire 69. Wire 88 and diode 89 connect up-microswitch 53 with wire 75 beyond diode 76 to up-relay 73, and wire 90 and diode 91 connect down-microswitch 52 with wire 77 beyond diode 78 to down-relay 74. Wires 92 and 93 connect relays 73 and 74 with the negative power supply in line wire 70. Diodes 76, 78, 80, 85, 89, and 91 pass current in one direction only in the direction of the arrowheads of the symbols shown.

As indicated by long dashed lines 94 and 95 running from up and down relays 73 and 74, respectively, the conveyor motor controls 96, control operation of conveyor motor 18 for selective up and down movement, the motor 18 being supplied with power by line wires 97 and 98. Similarly, as indicated by long dashed line 99, the speed of operation of motor 18 is controlled by fast speed relay 82. In other words, lines 94 and 95 tell the motor controls 96 the direction that reversing motor 18 should be operated, and line 99 tells the motor controls 96 the speed at which motor 18 should run.

Fast speed relay 82 is only energized when the conveyor is running under control of rotary switch 20. When energized, relay 82 directs controls 96 to supply power to motor 18 at high voltage, say 95 volts, for fast speed conveyor operation. When relay 82 is deenergized by rotary switch 20, as when the rotary switch is on a gap or "null" between contacts indexed for a selective pan, the relay 82 contacts direct controls 96 to supply low voltage power, say 48 volts, for slow operation of the conveyor. The direction of slow speed operation again is controlled by relays 73 and 74 which are connected with microswitches 52 and 53 and when either is closed, the motor 18 runs in the required direction at slow speed.

OPERATION OF THE LEVELING MECHANISM

Assume that a selector switch 19 has been pressed to cause the file to deliver a particular pan 10 at the work station. The rotary switch 20 through either the up-relay 73 or down-relay 74 directs the controls 96 to operate motor 18 in the required direction and at fast speed, say with power supplied at 95 volts DC.

Next, let it be assumed that the particular pan 10 illustrated in FIG. 5 is to be stopped at the work station 4, and is traveling downward as represented by the arrow 100 in FIG. 5, but is above the position shown in FIG. 5 so that cam 56 has not yet contacted the pin 23 on pan 10.

Figure 6:
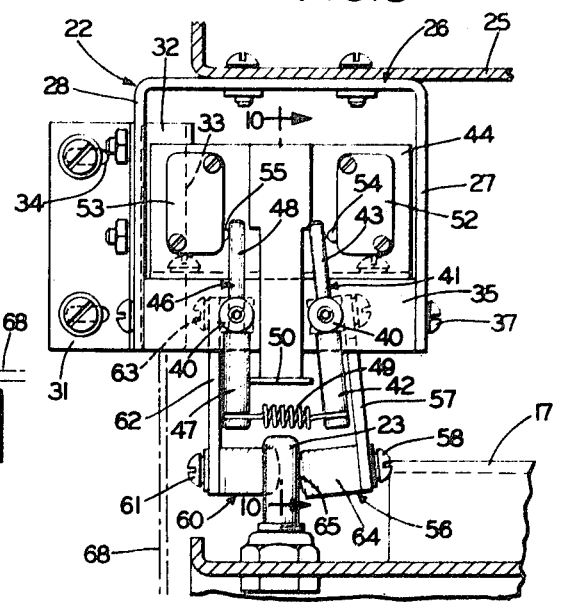
FIG. 6 is a fragmentary plan sectional view looking in the direction of the arrows 6—6, FIG. 5.

As pan 10 moves downward under fast speed conveyor drive movement in the direction of arrow 100, the cam end 64 at the upper end of down cam 56 engages pin 23 which moves down lever 41 to the position shown in FIG. 6. Such lever movement releases actuating button 54 of down control microswitch 52, permitting the switch 52 which had been held open to close. Closing of switch 52 completes the circuit through lines 69, 87, switch 52, wire 90, diode 91, and down-relay 74, to direct controls 96 to continue to operate motor 18 for conveyor movement down.

Meanwhile as selected pan 10 moves to within 2 to 3 inches of the predetermined stopped location, the "null" in the rotary switch for the selected pan 10 breaks the circuit from rotary switch 20 to fast speed relay 82. When relay 82 is deenergized, it signals controls 96 to switch from high to low voltage power supply to motor 18. Thus, the conveyor continues to move at slow speed in the down directions, and the particular selected pan 10 shown in FIG. 5 continues to move downward in the direction of the arrow 100. As selected pan 10 approaches and reaches the position shown in FIG. 7 (represented by pin 23), the lower end 64 of cam 56 releases engagement with pin 23, and, through the action of spring 49, the lever 41 moves to the position shown in FIG. 4 where the rear end 43 of lever 41 again engages and actuates button 54 of microswitch 52 to open its normally closed condition. When microswitch 52 is opened, the reduced voltage circuit is opened and the conveyor drive motor stops, thus stopping the conveyor.

If it should happen, due to unbalanced loading, that the pans mounted on and moving down on the right side of the conveyor in FIG. 2 have excess weight or excess loading, as compared to the loading of the pans moving upward on the left side of the conveyor of FIG. 2; the selected pan 10 in FIGS. 5 and 7 when being stopped may tend to coast downward beyond the position represented by pin 23 shown in FIG. 7 relative to the cams 56 and 60. If this happens the up control lever 46 is actuated by up cam 60 to close up-switch 53 and energize the up-relay 73 to provide reduced voltage and thus reduced speed operation of motor 18 to move pan 10 upward from its downwardly coasted position back to the position shown in FIG. 7. This, of course, involves reversing the direction of motor drive when the conveyor is driven up, rather than down, with respect to the pan positions illustrated by FIGS. 5 and 7.

When it happens that the selected pan to be delivered to and stopped at work station 4 approaches the work station moving up (FIG. 9—as indicated by pan pin 23 and arrow 101) rather than down, as just described, the operation of the cams, control levers, etc., is the reverse of that described concerning down conveyor movement arrival of a pan at the work station.

A fundamental aspect of the invention is the location of the stopping control mechanism so that the mechanism is actuated by the pan itself that is to be stopped, and not by some remotely related movable element of the conveyor mechanism.

Another important aspect of the invention is the slowing down of drive motor operation of the conveyor as any selected pan approaches the location where it is to be stopped.

These fundamental concepts function and cooperate to overcome difficulties previously encountered in power file operation incident to unbalanced pan and conveyor loading, direction of conveyor travel, slack in conveyor drive mechanism, variations in spacing due to manufacturing and assembly tolerances, wear of parts, etc.

A further difficulty that is overcome, is that inherently presented by the required spacing, however, small, of the "-null" between positions of the rotary switch for each selected pan indexed with relation to the pan selector switches and the pans represented thereby.

The improved power file leveling mechanism enables any selected pan to be stopped within one thirty-second of an inch of a predetermined required location, with the selected pan approaching from either direction, whether or not the conveyor loading is balanced or unbalanced.

As indicated, the cams 56 and 60 at the work station may be adjusted vertically (FIG. 8) with respect to each other so that the exact relationship between the cams and the control levers 41 and 46 with respect to pan pins 23 may be established when the file is assembled and put into operation.

Coordinated with this adjustment is the adjustment that may be made of the mounting of bracket 26 on frame 25 so that the normal position (FIGS. 4 and 7) of the control levers 41 and 46 and associated cams 56 and 60 laterally with respect to pan pins 23 may be established on assembly of the power file.

Another important aspect of the invention is the simplicity of the location, coordination, adjustment, and number of parts involved in the control mechanism in which only one pin is required, such as the pins 23, to be mounted in fixed position on each pan; and only one set of cams 56 and 60 is required associated with the control levers 41 and 46, respectively, in fixed relation to such cam with respect to its associated control lever. This eliminates the separate cams or ramps for each pan, and their initial adjustment and maintenance of adjustment of such cams or ramps on each pan, involved in the construction shown in said copending application, Ser. No. 87,228.

The elimination of many parts and of required adjustment for assembly, and maintenance during use, provides a file construction which is more dependable and efficient in operation.

The positively driven, but slowed down, operation of the conveyor as any pan approaches the position at which it is to be stopped, also permits very rapid operation or fast travel of the conveyor at other times when the conveyor is moving.

The improved leveling control mechanism thus provides positive control by the selected pan itself of the position at which the pan will be stopped at a predetermined location at a work station; provides a construction in which the leveling control mechanism actuated by the selected pan itself operates to slow down the positive power drive of the conveyor as the selected pan approaches its predetermined stopped position; provides for the adjustment of the leveling control mechanism components so that the exact relationship required can be established and maintained; provides a construction which eliminates variable manufacturing, assembly and operating characteristics of the drive and control mechanisms from file to file; provides a construction which eliminates parts heretofore required, and reduces adjustments and maintenance of adjustments of the control mechanism in assembly and during use; and provides a construction that avoids the difficulties and eliminates the problems heretofore encountered in the art with prior leveling control devices, thereby achieving the objectives indicated and solving problems which have arisen in the art.

In the foregoing description, certain terms have been used for brevity, clearness and understanding; but no unnecessary limitations are to be implied therefrom because such terms are used for descriptive purposes and are intended to be broadly construed.

Moreover, the description and illustration of the invention is by way of example, and the invention is not limited to the exact structures shown because the parts, components and mechanism may be varied to provide other structural embodiments without departing from the fundamental concepts, aspects and principles of the invention.

Having now described the features, discoveries and principles of the invention, the construction, assembly, characteristics, operation and use of a preferred form thereof, and the advantageous, new and useful results obtained thereby, the new and useful discoveries, principles, apparatus, combinations, parts, elements, subcombinations, structures and cooperative relationships which characterize the invention are set forth in the appended claims.

I claim:

1. In a power file of a type in which a plurality of pans are mounted on an endless conveyor mechanism carried by support means for movement in either direction in a continuous path of travel and any selected pan is delivered by movement in either direction to a predetermined work station location by actuating a pan selector switch in circuitry with rotary selector control switch means and conveyor power drive means, in which pan leveling control mechanism having spaced "up" and "down" control lever means pivotally mounted on said support means stops any selected pan at said predetermined station, in which normally closed microswitch means including control circuitry controlling voltage supplied to said power drive means is connected with said power drive means circuitry and is associated with and actuated by each "up" and "down" control lever means, in which said microswitch means includes switches mounted on said support means, and in which the "up" and "down" control lever means is spring-biased normally to engage the respective associated microswitch means to hold said microswitch means open; the improvement including cam means mounted on and movable with each "up" and "down" control lever means; a fixed actuator pin mounted on and projecting from each pan and moving past and engaging said cam means during movement of the conveyor; the pin on a selected pan engaging one of the cams mounted on said "up" and "down" control lever means as said selected pan approaches said control lever means to move the control lever means out of normal position to a position disengaging its associated microswitch means permitting the latter to close and actuate the control circuitry to supply reduced voltage to said power drive means and slow conveyor movement; and said pin on said selected pan then disengaging the control lever means to permit the lever means to return to normal position reengaging its associated microswitch means to open said microswitch means and stop conveyor movement with said selected pan at said predetermined work station location.

2. The construction defined in claim 1 in which the pivotal mounting of the "up" and "down" control lever means on said support means includes spaced shafts pivotally mounted on said support means, and in which the cam means are mounted on and project from said control lever means pivot shafts.

3. The construction defined in claim 2 in which bracket means is mounted on said support means, in which said shafts are pivotally mounted on vertical axes on said bracket means.

4. The construction defined in claim 3 in which the "up" and "down" control lever means also includes a lever having a front and a rear end pivotally mounted intermediate its ends on each of said pivot shafts, in which the front ends project toward the ends of the pans adjacent the path of travel of the pan ends, in which spring means is attached to the front ends of adjacent levers normally urging the front ends of the levers toward each other, in which the rear lever ends are located adjacent to and engage their respective associated microswitch means, and in which said cam means are carried by plates mounted on said shafts spaced below the front ends of said levers.

5. The construction defined in claim 4 in which the cams are vertically adjustable on the plates.

6. The construction defined in claim 1 in which the pivotal mounting of the "up" and "down" control lever means includes vertically spaced journal blocks mounted on said support means, vertically extending laterally spaced shafts journaled in said journal means, levers mounted intermediate their ends at the tops of said pivot shafts, and vertically extending cam means mounted in vertically spaced laterally offset relation on said pivot shafts intermediate the journal blocks.

7. The construction defined in claim 1 in which the cam means include "up" and "down" cams vertically spaced and laterally offset from each other, and in which each actuator pin fixed to each pan engages first one and then the other cam as the pans move past the cams during movement of the conveyor.

8. The construction defined in claim 1 in which the cam means include "up" and "down" vertically and laterally spaced and vertically offset adjustable cams, in which the control lever means include "up" and "down" levers pivotally mounted intermediate their ends on said support means, and in which spring means extend between the levers to normally bias the levers into engagement with the respective associated microswitch means and at the same time to bias said cams in opposed directions.

9. The construction defined in claim 1 in which the "up" and "down" control lever means cam means comprise vertically and laterally spaced and vertically offset adjustable cam successively engageable with the fixed actuator pin on each pan as the pans move past the control lever means during conveyor movement.

10. In a power file of a type in which a plurality of pans are mounted on an endless conveyor mechanism carried by support means for movement in either direction in a continuous path of travel and any selected pan is delivered by movement in either direction to a predetermined work station location by actuating a pan selector switch in circuitry with rotary selector control switch means and conveyor power drive means; control means including movable cams mounted on the support means adjacent said work station controlling operation of the conveyor power drive means; and a single pin fixed to each pan engageable with said control means cams operable upon arrival of a selected pan at said work station to actuate the control means to stop said selected pan at said station.

11. In a power file of a type in which a plurality of pans are mounted on an endless conveyor mechanism carried by support means for movement in either direction in a continuous path of travel and any selected pan is delivered by movement in either direction to a predetermined work station location by actuating a pan selector switch in circuitry with rotary selector control switch means and conveyor power drive means; control means including a plurality of relatively movable cams mounted in spaced relation adjacent the work station on the support means for operating the drive means selectively at fast and slow speeds; and a single pin fixed to each pan engageable with said control means cams and operable upon approach of a selected pan to said work station at fast speed upon engagement with one of said cams to actuate the control means to change the power drive to slow speed operation, and then upon disengaging said one cam to stop said selected pan at said work station.

* * * * *